United States Patent [19]

Mori

[11] Patent Number: 4,709,411

[45] Date of Patent: Nov. 24, 1987

[54] OPTICAL COMMUNICATION SYSTEM

[76] Inventor: Kei Mori, 3-16-3-501, Kaminoge, Setagaya-ku, Tokyo, Japan

[21] Appl. No.: 567,975

[22] Filed: Jan. 4, 1984

[30] Foreign Application Priority Data

Jan. 11, 1983 [JP] Japan ................................. 58-2583
Jan. 31, 1983 [JP] Japan ................................. 58-15101

[51] Int. Cl.[4] ............................................. H04B 9/00
[52] U.S. Cl. ................................. 455/601; 455/607
[58] Field of Search ............... 455/601, 606, 607, 617, 455/618, 619

[56] References Cited

U.S. PATENT DOCUMENTS

| | | | |
|---|---|---|---|
| 2,982,859 | 5/1961 | Steinbrecher | 455/617 |
| 3,504,182 | 3/1970 | Pizzurro et al. | 455/607 |
| 3,566,126 | 2/1971 | Lang et al. | 455/607 |
| 4,090,067 | 5/1978 | Bell, III et al. | 455/601 |
| 4,393,518 | 7/1983 | Briley | 455/618 |
| 4,491,982 | 1/1985 | Candy et al. | 455/607 |

FOREIGN PATENT DOCUMENTS 50116020 3/1977 Japan .................................. 455/601

OTHER PUBLICATIONS

Lanham-Air Force Lasercom Space Measurement Unit-Conf. NTC '80 IEEE 1980 Nat. Telecomm. Conf. Houston, Tex.-Nov. 30-Dec. 4, 1980, pp. 27.2.1-27.2.3.

*Primary Examiner*—Joseph A. Orsino, Jr.
*Attorney, Agent, or Firm*—Jordan and Hamburg

[57] ABSTRACT

In an optical communication system, transmitter/receivers located remote from each other have an identical construction and are accurately positioned relative to each other by means of photodetectors. Each apparatus includes a transmitter section and a receiver section which are disposed in a common transparent housing. Such a construction is applicable even to a repeater between the remote apparatuses by building another set of transmitter and receiver sections in the apparatus.

6 Claims, 5 Drawing Figures

OPTICAL COMMUNICATION SYSTEM

BACKGROUND OF THE INVENTION

The present invention relates to an optical communication system for allowing two remote stations to exchange information carrying light with or without the aid of a repeater. The two remote stations may be two fixed stations, or a fixed station and a mobile station, or even two mobile stations such as vessels.

In an optical communication system, a first station sends out information carrying light, or an optical signal, to a remote second station with or without a repeater employed depending upon the distance between the stations as well as other conditions. The two remote stations are often constructed on the rooftops of buildings. In such a case and, particularly when the buildings are tall, the system suffers from the drawback that the accuracy of communications is lowered due to displacements of the buildings which result from, for example, a difference in temperature between building portions in the sun and those out of the sun. That is, the transmitting station would emit an optical signal in a direction other than proper one while the receiving station would misorient the light receiving surfaces of lenses, disenabling the receiving station to catch the signal or reducing the quantity of received light.

Assume that the transmitting and receiving stations are remote from each other by a distance of two kilometers, and that a light source at the transmitting station has a diameter of three centimeters by way of example. Then, light emanating from the light source spreads itself to a diameter as large as about three meters when received by the receiving station and, therefore, the whole quantity of transmitted light cannot be received unless use is made of a lens having a diameter of three meters. As previously stated, any error in the relative position between the transmitter and the receiver would reduce the quantity of received light or practically make it zero. This constitutes another cause of a decrease in the quantity of received light and, thereby, that of a decrease in the communication accuracy, although a certain degree of redundancy is available concerning misorientation of the transmitter and receiver relative to each other.

SUMMARY OF THE INVENTION

It is therefore an object of the present invention to provide an optical communication system which achieves an improved accuracy in communications between remote stations.

It is another object of the present invention to provide an optical communication system which increases an available network range (distance between stations) while cutting down the costs.

It is another object of the present invention to provide a generally improved optical communication system.

An optical communication system of the present invention includes a plurality of remote optical communication apparatuses which exchange information carrying light, or optical signals, with each other. Each of the apparatuses comprises a light source for emitting parallel rays toward second one of the apparatuses as an optical signal, and means for sensing parallel rays emitted from the second apparatus to cause the apparatus to automatically follow a direction of the parallel rays from the second apparatus.

In accordance with the present invention, in an optical communication system, transmitter/receivers have an identical construction and are accurately positioned relative to each other by means of photodetectors. Each apparatus includes a transmitter section and a receiver section which are disposed in a common transparent housing. Such a construction is applicable even to a repeater between the remote apparatuses by building another set of transmitter and receiver sections in the apparatus.

The above and other objects, features and advantages of the present invention will become apparent from the following detailed description taken with the accompanying drawing.

DESCRIPTION OF THE PREFERRED EMBODIMENTS

While the optical communication system of the present invention is susceptible of numerous physical embodiments, depending upon the environment and requirements of use, substantial numbers of the herein shown and described embodiments have been made, tested and used, and all have performed in an eminently satisfactory manner.

Figure 1:
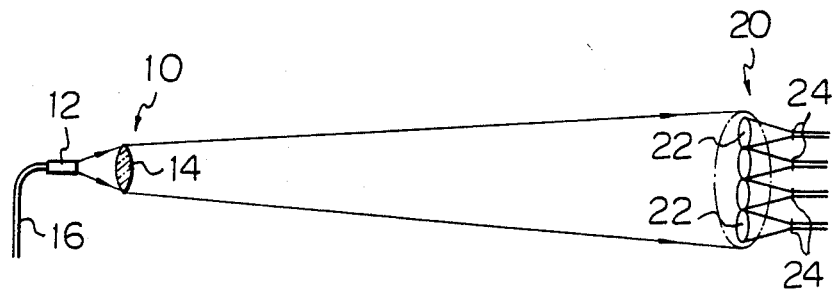
FIG. 1 is a schematic view of an optical communication system demonstrating the principle of the present invention.

Referring to FIG. 1 of the drawing, the principle of operation of the system in accordance with the present invention is schematically illustrated. The reference numeral 10 designates a transmitter station and 20, a receiver station. In practice, the transmitter station 10 and receiver station 20 may be spaced several hundreds of meters to several kilometers from each other.

The transmitter 10 includes a light emitting element such as a light emitting diode (LED) 12, a converging lens 14, and leads 16. The LED 12 is energized and deenergized by an image signal which is routed thereto through the leads 16. The information carrying light or optical signal emitted from the LED 12 is converged by the lens 14 to become substantially parallel rays, which are then transmitted to the receiver 20.

The receiver 20 comprises a plurality of lenses 22, and photoelectric transducer elements 24 which are located at or substantially at the focal points of the lenses 22 and associated in one-to-one correspondence therewith. While each of the lenses 22 converges the incoming optical signal, the photoelectric transducer 24 associated therewith converts the converged optical signal into an electric signal. The electric signals received in the manner described are subjected to analog summation and then converted into digital two levels or, alternatively, the electric signals are individually converted into digital two levels and then processed to give final digital two levels on a decision-by-majority basis. In this manner, the incoming digital optical signal is reproduced as a digital electric signal.

Figure 2:
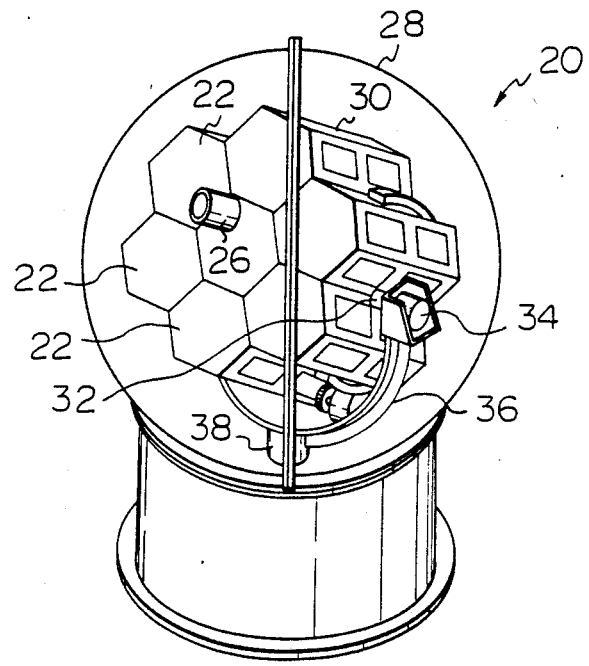
FIG. 2 is a perspective view of a receiver forming part of the present invention.

Referring to FIG. 2, an example of the receiver 20 in accordance with the present invention is shown. The receiver 20 includes the lenses 22 and a photodetector section 26 adapted to sense a direction in which an optical signal propagates as described. The lenses 22 and photodetector 26 are disposed in a transparent housing 28 and retained by a frame 30. The frame 30 is mounted on a first rotary shaft 32 which is driven by a first motor 34. The rotary shaft 32 is supported by a generally C-shaped arm 36. The arm 36 is driven by a second rotary shaft 38 about an axis which is perpendicular to the axis of the shaft 32. The second shaft 38 is driven by a second motor (not shown).

The receiver shown in FIG. 2 is essentially similar to a solar collector which the applicant has proposed in various forms, such as one disclosed in Japanese patent application No. 57-2156/1982 Japanese Unexamined patent application (Kakai) No. 120203 published July 18, 1983. While the photodetector 26 senses a direction of incidence of the optical signal emanating from the transmitter 10, the first and second rotary shafts 32 and 38 are controlled in response to an output of the photodetector 26 to always orient the lenses 22 toward the optical signal incidence direction. In the solar collector which the applicant has proposed, a light receiving end of a light conducting element is positioned at the focal point of each lens so that the sunlight converged by the lens may be guided by the light conducting element to any desired location. In the illustrated embodiment of the present invention, the photoelectric transducer 24 is located at the focal point of the lens 22 instead of the end of the light conductor, thereby converting the incoming optical signal into an electric signal.

The applicant has also proposed in various forms a sunlight sensor in conjunction with a solar collector, as disclosed in Japanese patent application No. 57-128583/1922 for example. The photodetector 26 in the receiver 20 may comprise the proposed sunlight sensor without any modification applied thereto and, therefore, detailed description thereof will be omitted for simplicity. By way of example, however, the aforementioned Japanese patent application No. 57-128585/1982, discloses a photodetector which comprises a hollow body having a flange with a window and photosensors disposed in the body such that when the body is in accurate alignment with the direction of the sun, the photosensors receive the same amount of sunlight but when the body is offset from the direction of sun, they receive different amounts of light. Such difference is detected to control the body such that the same amount of sunshine becomes incident to the photosensors. Accordingly, the body is kept oriented in the direction of the sun with accuracy.

While the receiver assembly has been shown and described as being installed in the transparent housing 28, such does not constitute any essential part of the present invention. However, the housing 28 would keep the lens surfaces, photodetector and the like from dust and should only be cleaned from time to time, rendering maintenance of the receiver quite easy.

Figure 3:
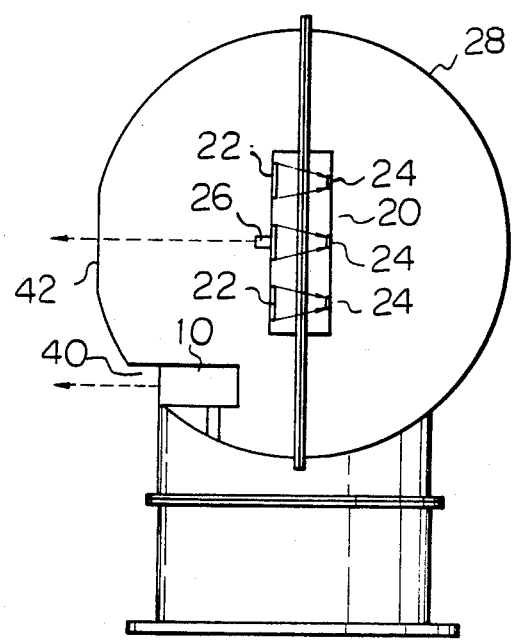
FIG. 3 is a schematic elevation of a transmitter/receiver in accordance with the present invention.

Referring to FIG. 3, an example of a transmit/receive apparatus is shown in which the transmitter 10 is disposed in the housing 28 in addition the receiver 20. The housing 28 is formed with an opening 40 for the passage of an optical signal which emanates from the transmitter 10. Alternatively, the transmitter 10 may be built in the photodetector section 26 inside the housing 28. In this alternative construction, a portion 42 of the housing 28 may be formed as a flat surface which is substantially perpendicular to the direction of propagation of the optical signal emanating from the transmitter 10. Then, the optical signal from the transmitter 10 will be prevented from being scattered by the specific portion 42 of the housing 28.

Figure 4:
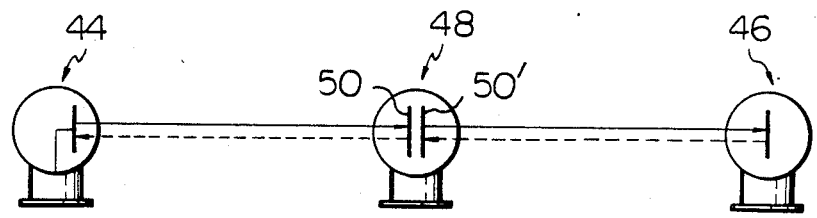
FIG. 4 is a schematic diagram of another embodiment of the present invention which includes a repeater.
Figure 5:
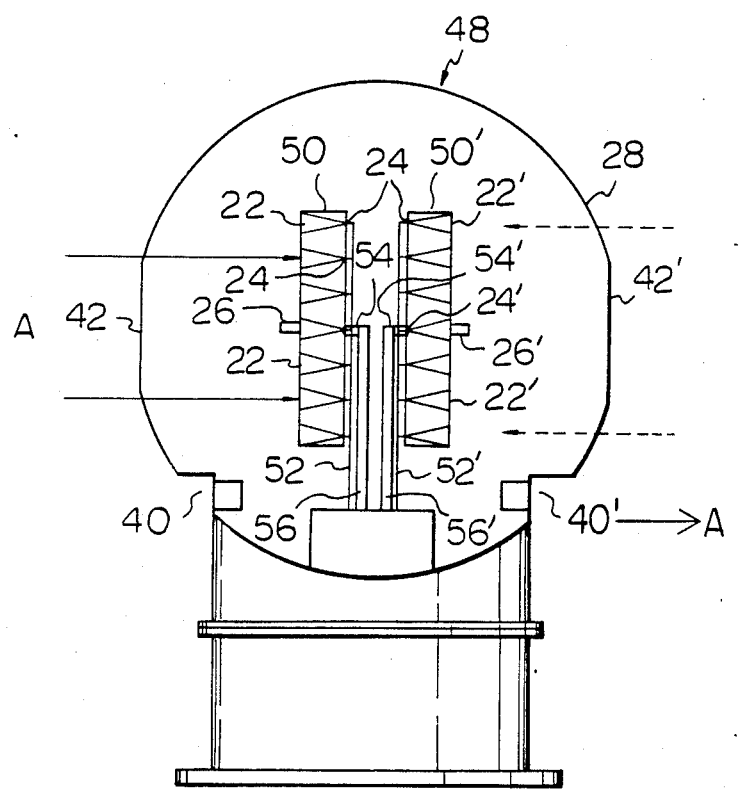
FIG. 5 is an elevation showing the repeater of FIG. 4.

Referring to FIGS. 4 and 5, another embodiment of the present invention is shown. In these drawing, the same or similar structural elements as those shown in FIGS. 1-3 are designated by the same reference numerals. As shown, two transmitter/receivers 44 and 46 are located remote from each other, while a repeater 48 is located therebetween. Each of the transmitter/receivers 44 and 46 is constructed to exchange optical signals in the manner described with reference to FIGS. 1-3. The repeater 48 is adapted to relay the optical signals between the transmitter/receivers 44 and 46 and, as well known in the art, it is used when any obstruction exists between the transmitter/receivers 44 and 46 or when the distance therebetween is too long, for example.

As shown in detail in FIG. 5, the repeater 48 comprises a first transmitter/receiver assembly 50 and a second transmitter/receiver assembly 50' which are precisely identical in construction with each other. The transmitter/receiver assemblies 50 and 50' are arranged back to back and may be accommodated in the transparent housing 28. Assuming that an optical signal A is transmitted from the station 44 to the station 46, the numerous lenses 22 in the first transmitter/receiver assembly 50 of the repeater 48 receive the optical signal A and each of the associated photoelectric transducers 24 transforms the incoming optical signal into an electric signal. The electric signal is fed by leads 52 to a signal processing device (not shown) to be thereby converted into an electric signal which is equivalent to the incoming optical signal. A transmitter section 40' of the second transmitter/receiver assembly 50' is driven by the electric signal to emit an optical signal A' toward the other station 46. Where an optical signal is transmitted from the station 46 to the station 44, on the other hand, lenses 22' of the second transmitter/receiver assembly 50' receive the optical signal to transform it into an electric signal. The transmitter section 40 of the first assembly 50 is then driven by the electric signal to send out an optical signal to the station 44.

In FIG. 5, the first transmitter/receiver assembly 50 is provided with first and second rotary shafts 54 and 56 and the second transmitter/receiver assembly 50', first and second rotary shafts 54' and 56'. Although illustrated only schematically in FIG. 5, the first and second rotary shafts 54 and 56 or 54' and 56' are constructed as shown in FIG. 2. The two assemblies 50 and 50' are installed in the transparent housing 28 which is identical with the aforementioned housing except for the provision of a flat surface 42' in addition to the flat surface 42.

Although installing the assemblies 50 and 50' in the housing 28 or in a single housing is not essential in accordance with the present invention, it would protect the assemblies from dust and the like as previously described. Installing them in a single housing would markedly cut down the space for installation and facilitate maintenance. Further, the configuration of the housing 28 is only illustrative and may be replaced with any other desired one. For example, an oblong or cocoon-shaped housing would accommodate the two transmitter/receiver assemblies with greater margins.

In summary, it will be seen that the present invention provides an optical communication system which insures accurate optical communications between remote stations by maintaining them always in a proper relative position. The transmitter/receivers used for the system are identical with each other to trim the costs required for the whole system.

Various modifications will become possible for those skilled in the art after receiving the teachings of the present disclosure without departing from the scope thereof.

What is claimed is:

1. An optical communication system comprising a first communication means comprising a first light source means for emitting first parallel light rays as an optical signal, a second communication means receiving said first parallel light rays, said second communication means comprising first sensor means for sensing said first parallel rays emitted from said first light source means to cause said second communication means to automatically follow the direction of said first parallel light rays from said first light source means, said second communication means comprising a first plurality of lenses for receiving the optical signals sent from said first light source means, said second communication means further comprising first photoelectric transducer elements located in one-to-one correspondence at focal points of said respective first plurality of lenses, whereby output signals of the respective first photoelectric transducer elements are processed to convert the received optical signal into a first electric signal, said second communication means further comprising a repeater means driven by said first electric signal for emitting second parallel light rays as an optical signal, a third communication means receiving said second parallel light rays, said third communication means comprising a second plurality of lenses for receiving the optical signals sent from said repeater means, said third communication means further comprising second photoelectric transducer elements located in one-to-one correspondence at focal points of said respective second plurality of lenses, whereby output signals of the respective second photoelectric transducer elements are processed to convert the received optical signal into a second electric signal, and second sensor means on said third communication means for sensing said second optical signal sent out from said repeater means to cause said third communication means to automatically follow the direction of said second parallel light rays emitted from said repeater means.

2. An optical communication system according to claim 1, in which said second communication means is disposed in a housing which is made of a transparent material.

3. An optical communication system according to claim 1, in which said third communication means is disposed in a transparent housing comprising a flat section substantially perpendicularly of the direction of propagation of said second optical signal output from said repeater means.

4. An optical communication system according to claim 1, in which said second communication means comprises a transparent housing in which said repeater means is accommodated.

5. An optical communication system according to claim 4, in which said housing is formed with a surface portion through which said second communication means receives said first optical signals, said surface portion being substantially perpendicular to the direction of propagation of the last said first optical signal.

6. An optical communication system comprising a first communication means comprising a first light source means for emitting first parallel light rays as an optical signal, a second communication means having a first section receiving said first parallel light rays, said first section of said second communication means comprising first sensor means for sensing said first parallel rays emitted form said first light source means to cause said first section of said second communication means to automatically follow the direction of said first parallel light rays from said first light source means, said first section of said second communication means comprising a first plurality of lenses for receiving said first optical signals sent from said first light source means, said first section further comprising first photoelectric transducer elements located in one-to-one correspondence at focal points of said respective first plurality of lenses, whereby output signals of the respective first photoelectric transducer elements are processed to convert the received optical signal into a first electric signal, said second communication means further comprising a first repeater means driven by said first electric signal for emitting second parallel light rays as an optical signal, a third communication means receiving said second parallel light rays, said third communication means comprising a second plurality of lenses for receiving said second optical signal sent from said first repeater means, said third communication means further comprising second photoelectric transducer elements located in one-to-one correspondence at focal points of said respective second plurality of lenses, whereby output signals of the respective second photoelectric transducer elements are processed to convert the received second optical signal into a second electric signal, second sensor means on said third communication means for sensing said second optical signal sent out from said first repeater means to cause said third communication means to automaticlly follow the direction of the second parallel light rays emitted from said first repeater means, second light source means for emitting third parallel light rays as an optical signal, said second communication means having a second section receiving said third parallel light rays, said second section of said second communication means comprising a third sensor means for sensing said third parallel rays emitted from said second light source means to cause said second section of said second communication means to automatically follow the direction of said third parallel light rays from said second light source means, said second section of said second communication means comprising a third plurality of lenses for receiving said third optical signal sent from said second light source means, said second section of said second communication means further comprising a third photoelectric transducer elements located in one-to-one correspondence at focal points of said respective third plurality of lenses, whereby output signals of the respective third photoelectric transducer elements are processed to convert the received optical signal into a third electric signal, said second communication means further comprising a second repeater means driven by said third electric signal for emitting fourth parallel light rays as an optial signal, said first communication means receiving said fourth parallel light rays, said first communication means comprising a fourth plurality of lenses for receiving said fourth optical signal sent from said second repeater means, said first communication means further comprising fourth photoelectric transducer elements located in one-to-one correspondence at focal points of said respective fourth plurality of lenses, whereby output signals of the respective fourth photoelectric transducer elemets are processed to convert the received optical signal into a fourth electric signal, and fourth sensor means on said first communication means for sensing said fourth optical signal sent out from said second repeater means to cause said first communication means to automatically follow the direction of the fourth parallel light rays emitted from said second repeater means.

* * * * *